United States Patent [19]

Fritz, Jr.

[11] Patent Number: 5,486,987

[45] Date of Patent: Jan. 23, 1996

[54] BOAT UTILITY LIGHT

[76] Inventor: Jack D. Fritz, Jr., 9003 Marsh Rd., Plainwell, Mich. 49080-8820

[21] Appl. No.: 368,969

[22] Filed: Jan. 5, 1995

[51] Int. Cl.$^6$ .......................... H01R 33/00; F21V 21/28
[52] U.S. Cl. .......................... 362/226; 362/275; 362/287; 362/418
[58] Field of Search .................... 362/191, 226, 362/275, 285, 287, 413, 418, 427, 61

[56] References Cited

U.S. PATENT DOCUMENTS

| 1,541,752 | 6/1925 | Sampson | 362/413 |
|---|---|---|---|
| 1,870,687 | 8/1932 | McCandless | 362/275 |
| 1,930,993 | 10/1933 | Blodgett | 362/275 |
| 2,392,447 | 1/1946 | Archer | 362/418 |
| 3,388,249 | 6/1968 | Siegel et al. | 362/413 |
| 4,692,850 | 9/1987 | Ledoux | 362/285 |

FOREIGN PATENT DOCUMENTS 0100069  10/1940  Germany ................ 362/413

Primary Examiner—Ira S. Lazarus
Assistant Examiner—Y. Quach

[57] ABSTRACT

A boat utility light including a rigid base; a coupling mechanism for securing the base to a recipient supporting surface; an elongated rigid linear lamp supporting tube having an upper end and a lower end and with the lower end removably coupled to the base; a lamp socket having a base end, an electrically conductive tip end, and an electrically-energizeable power switch coupled thereto, the power switch having one orientation for allowing electrical energy to be delivered to the tip end and another orientation for preventing such delivery; a lamp adjustment tube formed of a piece of flexible tubing secured between the base end of the lamp socket and the upper end of the lamp supporting tube; a lamp removably secured within the tip end of the lamp socket for providing illumination when electrically energized; and a power transmission mechanism for coupling the power switch with an external source of electrical energy.

4 Claims, 3 Drawing Sheets

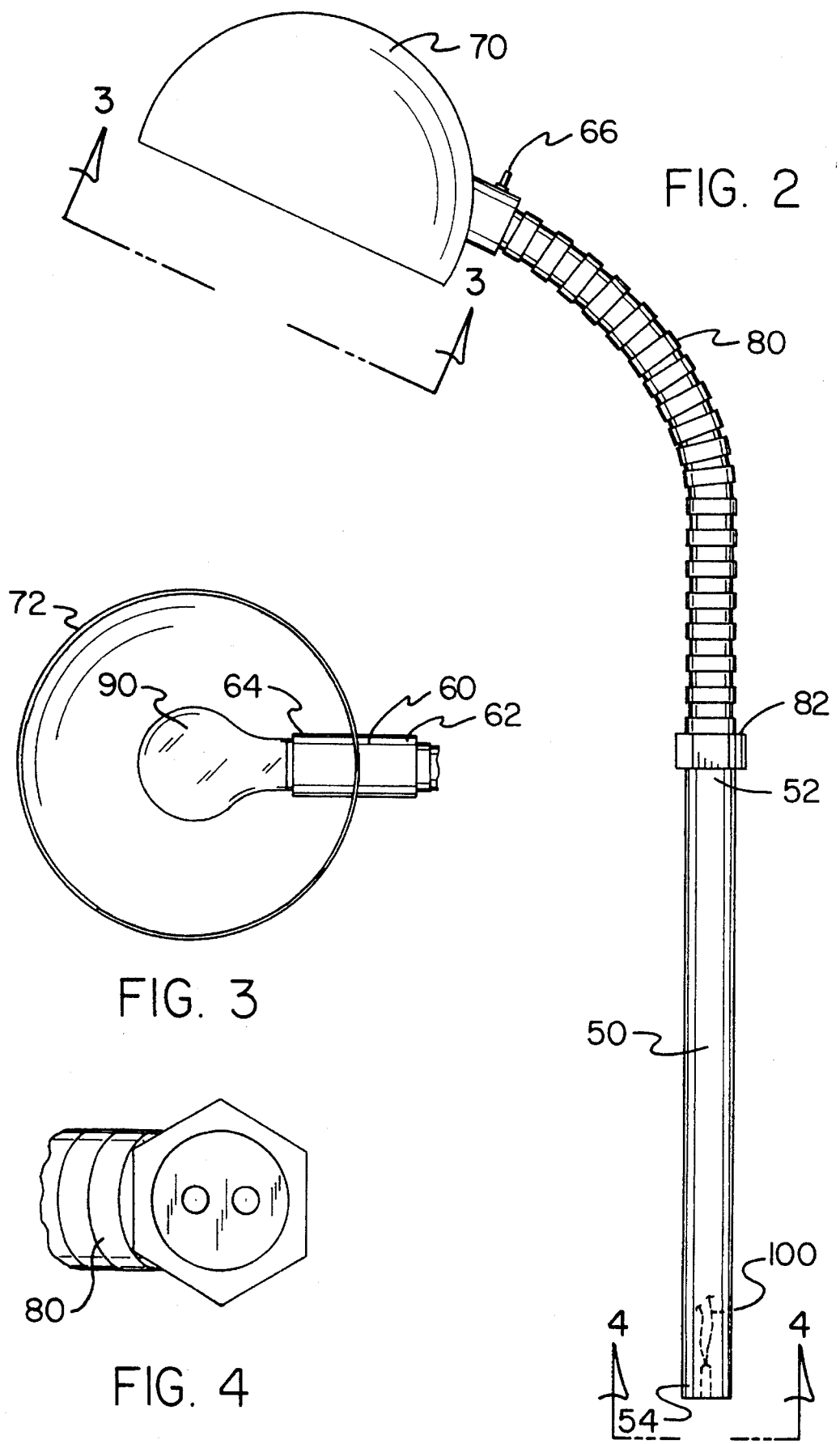

BOAT UTILITY LIGHT

BACKGROUND OF THE INVENTION

1. Field of the Invention

The present invention relates to a boat utility light and more particularly pertains to providing illumination for a fisherman who is fishing under conditions of limited visibility with a boat utility light.

2. Description of the Prior Art

The use of boat light apparatuses is known in the prior art. More specifically, boat light apparatuses heretofore devised and utilized for the purpose of providing illumination are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 315,417 to Ziaylek, Jr. et al. discloses a boat transom light. U.S. Pat. No. 3,851,166 to Kohler discloses a boat utility light apparatus. U.S. Pat. No. 4,360,859 to Ziaylek, Jr. discloses a boat light having a resiliently flexible and adjustable mount. U.S. Pat. No. 4,445,163 to Ziaylek, Jr. discloses a boat light, especially for transom mounting. U.S. Pat. No. 4,884,173 to Cassidy discloses a combination running light and spot light device for a boat.

While these devices fulfill their respective, particular objective and requirements, the aforementioned patents do not describe a boat utility light that is readily secured to a boat for use and directs illumination to a desired location when fishing under low visibility conditions.

In this respect, the boat utility light according to the present invention substantially departs from the conventional concepts and designs of the prior art, and in doing so provides an apparatus primarily developed for the purpose of providing illumination for a fisherman who is fishing under conditions of limited visibility.

Therefore, it can be appreciated that there exists a continuing need for new and improved boat utility light which can be used for providing illumination for a fisherman who is fishing under conditions of limited visibility. In this regard, the present invention substantially fulfills this need.

SUMMARY OF THE INVENTION

In the view of the foregoing disadvantages inherent in the known types of boat light apparatuses now present in the prior art, the present invention provides an improved boat utility light. As such, the general purpose of the present invention, which will be described subsequently in greater detail, is to provide a new and improved boat utility light and method which has all the advantages of the prior art and none of the disadvantages.

To attain this, the present invention essentially comprises, in combination, a rigid base. The base includes a planar cover plate with a top surface, a bottom surface, a generally petaloid periphery interconnecting the surfaces formed of a front edge, a rear edge, and opposed side edges, a central bore disposed thereon, a first pair of through holes disposed thereon near the front edge, a second pair of through holes disposed thereon near the rear edge and with each through hole sized for receipt of a screw for securing the bottom surface in facing contact with a recipient supporting surface. The base includes a generally rectangular planar cover hingeably coupled to the top surface of the cover plate and positionable in facing contact with the top surface of the cover plate for preventing access through the bore. Lastly, the base includes a holding tube having an upper end coupled to the bottom surface of the cover plate in alignment with the bore thereof and a lower end projected angularly downwards therefrom to thereby create an acute angle between the holding tube and the bottom surface of the cover plate.

An elongated rigid linear lamp supporting tube is included. The lamp supporting tube has an upper end and a lower end. The lower end of the lamp supporting tube is slidably disposed within the bore of the cover plate and frictionally removably secured within the holding tube. A lamp socket is included and has a threaded base end, an electrically conductive threaded tip end, and an electrically-energizeable power switch coupled thereto. The power switch has one orientation for allowing electrical energy to be delivered to the tip end and another orientation for preventing such delivery. A rigid and generally hemispheric light shroud is included and secured about the lamp socket between the ends thereof. The shroud has a circular opening with a diameter that is about 22% of the length of the lamp supporting tube.

A lamp adjustment tube is also provided. The lamp adjustment tube is formed of a piece of flexible tubing secured between the base end of the lamp socket and the upper end of the lamp supporting tube. The lamp adjustment tube has an extended linear length that is about 37% of the length of the lamp supporting tube. A lamp is included and removably secured within the tip end of the lamp socket within the shroud for providing illumination when electrically energized. Lastly, a pair of electrically conductive wires are included with each wire having a first end coupled to the power switch and a second end extended through the lamp adjustment tube and lamp supporting tube for coupling with an external source of electrical energy.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved boat utility light which has all the advantages of the prior art boat light apparatuses and none of the disadvantages.

It is another object of the present invention to provide a new and improved boat utility light which may be easily and efficiently manufactured and marketed.

It is a further object of the present invention to provide a new and improved boat utility light which is of durable and reliable construction.

An even further object of the present invention is to provide a new and improved boat utility light which is susceptible of a low cost of manufacture with regard to both materials and labor, and which accordingly is then susceptible of low prices of sale to the consuming public, thereby making such a boat utility light economically available to the buying public.

Still yet another object of the present invention is to provide a new and improved boat utility light which provides in the apparatuses and methods of the prior art some of the advantages thereof, while simultaneously overcoming some of the disadvantages normally associated therewith.

Even still another object of the present invention is to provide a new and improved boat utility light for providing illumination for a fisherman who is fishing under conditions of limited visibility.

Lastly, it is an object of the present invention to provide a new and improved boat utility light comprising a rigid base; coupling means for securing the base to a recipient supporting surface; an elongated rigid linear lamp supporting tube having an upper end and a lower end and with the lower end removably coupled to the base; a lamp socket having a base end, an electrically conductive tip end, and an electrically-energizeable power switch coupled thereto, the power switch having one orientation for allowing electrical energy to be delivered to the tip end and another orientation for preventing such delivery; a lamp adjustment tube formed of a piece of flexible tubing secured between the base end of the lamp socket and the upper end of the lamp supporting tube; a lamp removably secured within the tip end of the lamp socket for providing illumination when electrically energized; and power transmission means for coupling the power switch with an external source of electrical energy.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side-elevational view of the present invention.

FIG. 3 is a view of the present invention taken along the line 3—3 of FIG. 2.

FIG. 4 is a view of the present invention taken along the line 4—4 of FIG. 2.

The same reference numerals refer to the same parts through the various Figures.

DESCRIPTION OF THE PREFERRED EMBODIMENT

Figure 1:
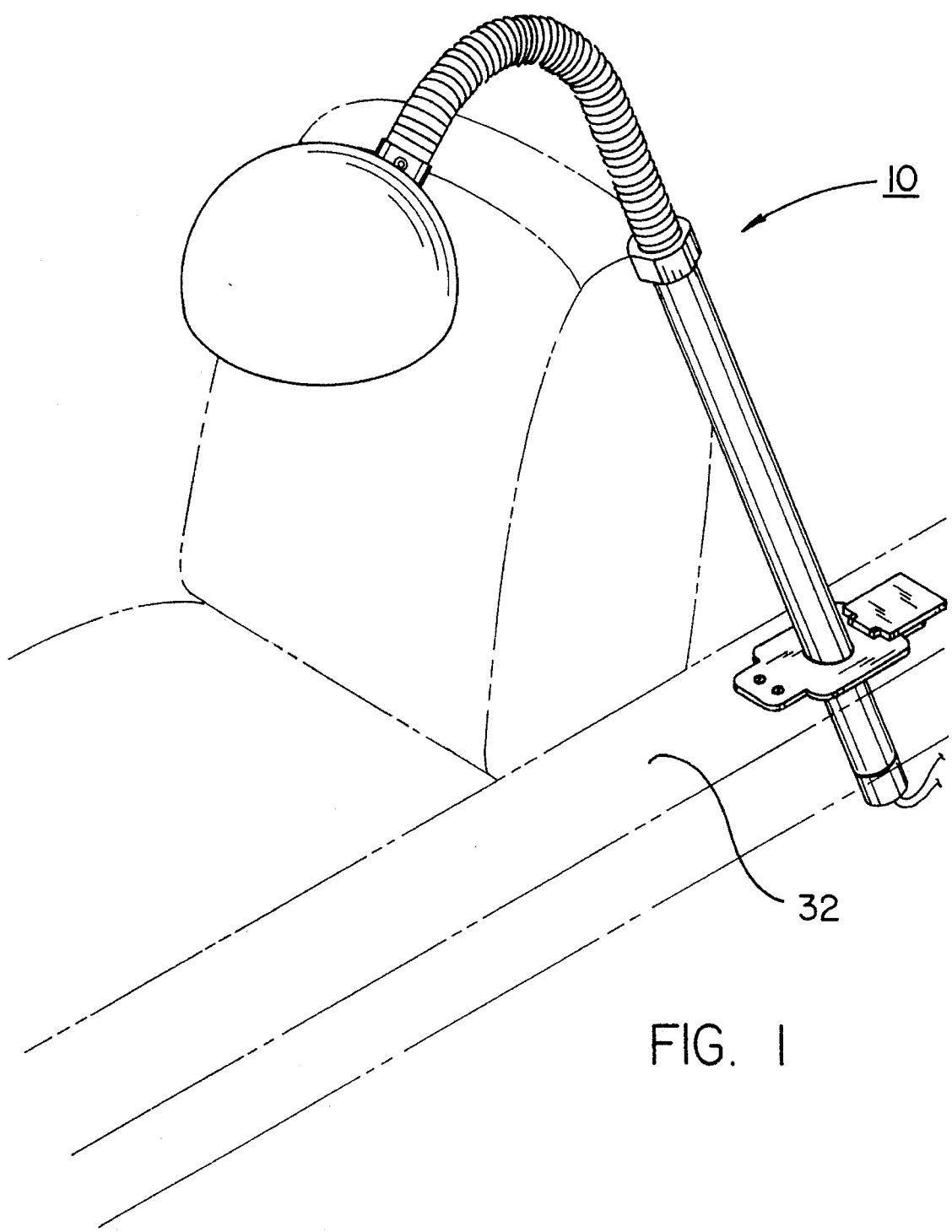
FIG. 1 is a perspective view of the preferred embodiment constructed in accordance with the principles of the present invention secured to a boat for use.
Figure 5:
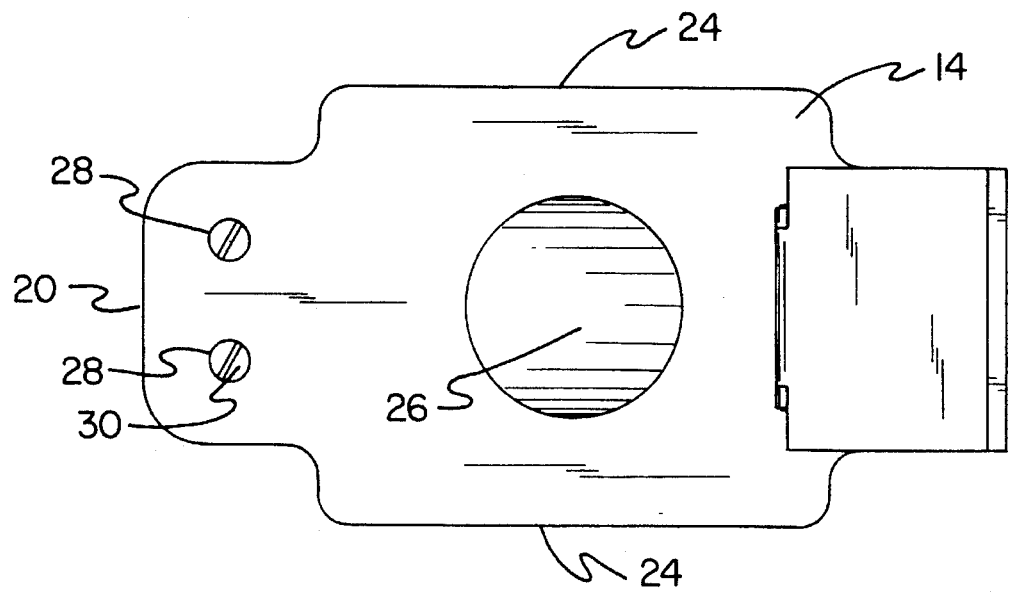
FIG. 5 is a plan view of the cover plate and cover of the base.

With reference now to the drawings, and in particular, to FIG. 1 thereof, the preferred embodiment of the new and improved boat utility light embodying the principles and concepts of the present invention and generally designated by the reference number 10 will be described.

The present invention is comprised of a plurality of components. In their broadest context, such components include a base, an electrically switchable lamp, and supporting tubes. Such components are individually configured and correlated with respect to each other to provide the intended function of providing illumination for a fisherman who is fishing under conditions of limited visibility.

The present invention includes a base 12. The base is formed of a rigid material such as metal or plastic. The base includes a planar cover plate 14. The cover plate has a top surface 16, a bottom surface 18, and a generally petaloid periphery interconnecting the surfaces. The periphery is formed of a front edge 20, a rear edge 22, and opposed side edges 24. The cover plate also includes a central bore 26 disposed therethrough. The bore has a diameter of at least ¾ inch. Furthermore, the cover plate includes a first pair of through holes 28 disposed thereon near the front edge and a second pair of through holes 29 disposed thereon near the rear edge. Each through hole is sized for receiving a screw 30 therein for securing the bottom surface 18 in facing contact with a recipient supporting surface 32 such as a portion of a boat.

The base also includes a generally planar and rectangular cover 36. The cover is formed of a rigid plastic or metal. The cover is secured to the top surface 16 of the cover plate with a hinge 38. The cover is positionable in facing contact with the top surface 16 of the cover plate for preventing access through the bore 26.

Figure 6:
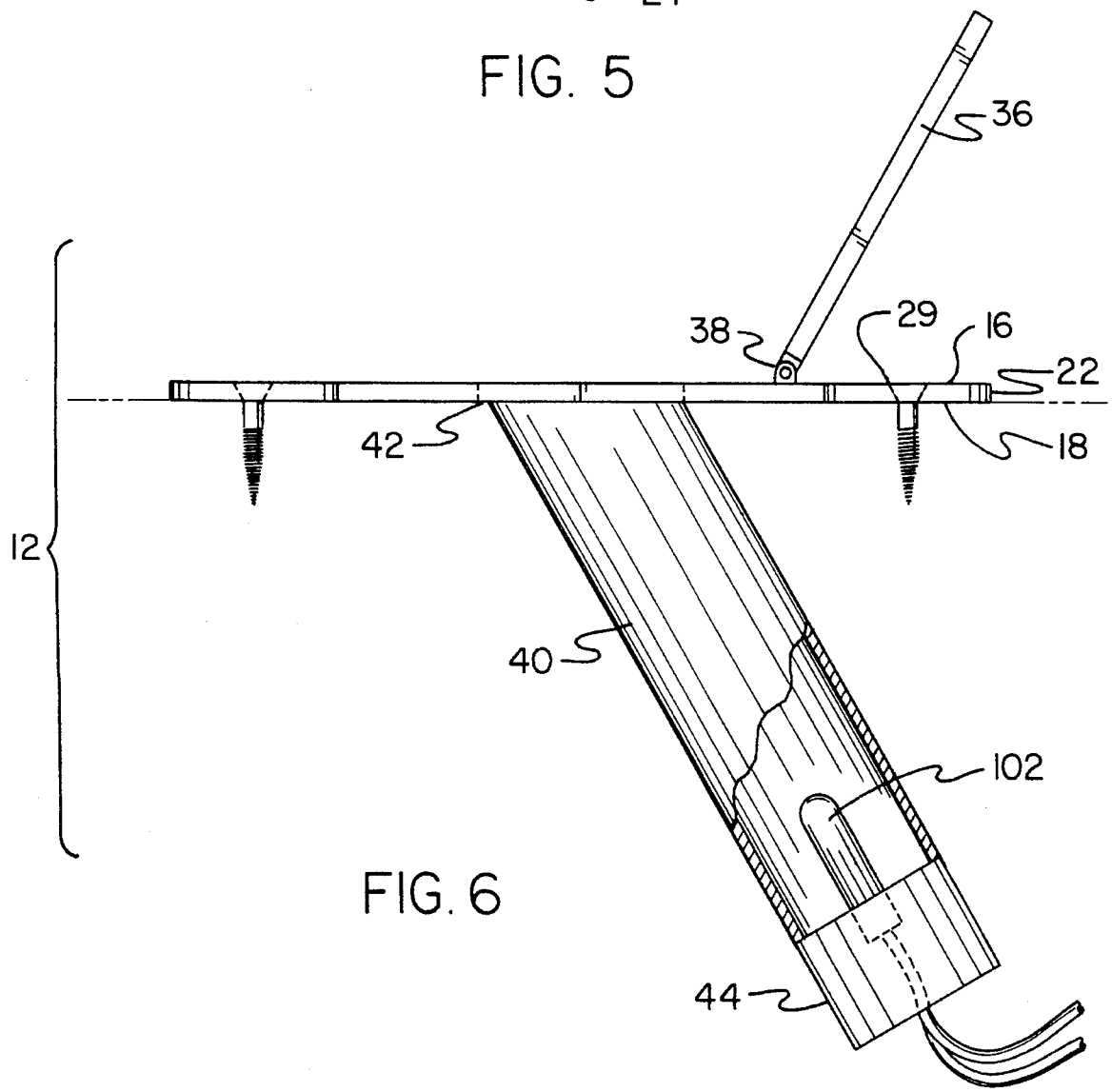
FIG. 6 is a side-elevational view of the base with wires extended therefrom for securement to a battery.

Also provided with the base is a holding tube 40 as illustrated in FIG. 6. The interior diameter of the holding tube is at least ¾ inches. The holding tube has an upper end 42 coupled to the bottom surface 18 of the cover plate in alignment with the bore 26. The holding tube also has a lower end 44 projected angularly downwards from the cover plate to thereby create an acute angle between the holding tube and bottom surface 18.

Also provided is a lamp supporting tube 50. The lamp supporting tube is elongated and linear in structure. It has an exterior diameter of about ¾ inch. The lamp supporting tube is formed of a rigid material such as metal or plastic. The lamp supporting tube has an upper end 52 and a lower end 54. The lower end is slidably disposed within the bore 26 of the cover plate and frictionally removably secured within the holding tube as shown in FIG. 1. In the preferred embodiment, the lamp supporting tube has a length of 27 inches.

Also included is a lamp socket 60 as shown in FIG. 2 and FIG. 3. The lamp socket has a threaded base end 62, an electrically conductive threaded tip end 64, and an electrically-energizeable power switch 66 extended therefrom. The power switch has one orientation for allowing electrical energy to be delivered to the tip end 64 and another orientation for preventing such delivery.

To direct light to a desired location, a generally hemispheric light shroud 70 is included. The light shroud 70 is formed of a rigid material such as metal or plastic. The shroud is secured about the lamp socket 60 between the ends thereof. The shroud has an unlabeled circular opening from which light is projected. The opening has a diameter of about 6 inches or 22% of the length of the lamp supporting tube.

To allow the shroud to be positioned in a desired location, the lamp adjustment tube 80 is provided. The lamp adjustment tube is formed of a piece of flexible tubing having an upper end with threads formed thereon and a lower end with a hex nut 82 coupled thereto. The lamp adjustment tube is extended between the base end 62 of the lamp and the upper end of the lamp supporting tube 52. The lower end of the lamp adjustment tube is coupled to the lamp supporting tube with an integral hex nut 82. The base end of the lamp socket is threadedly coupled to the upper end of the lamp adjustment tube. The lamp adjustment tube has an extended linear length of 10 inches or 37% of the length of the lamp supporting tube 50.

Also provided is a lamp 90 as shown in FIG. 3. The lamp is secured within the tip end of the lamp socket and within the shroud. The lamp provides illumination when electrically energized. The lamp is conventional in design and commercially available.

To provide electrical energy to the lamp, a pair of electrically-conductive and sheathed wires 100 are included. Each wire has a first end coupled to the power switch 66 and a second end extended through the lamp adjustment tube and lamp supporting tube. The second ends of the wires are used for coupling with an external source of electrical energy such as a boat's battery. Commercially available electrical wire connectors 102 are used for performing this coupling.

The present invention is a boat light with a flexible tube and a half-moon shroud, which makes it easier to see either in the boat or in the water when night fishing. The present invention can be made from metal or plastic. It consists of a light on the end of a 10 inch length flexible lamp adjustment tubing defining a neck which itself is mounted to a 27 inch rigid lamp supporting tube with a ¾inch diameter. The dimensions as set forth allow the present invention to readily stored within storage compartments of most boats. The rigid lamp supporting tube slides into a base on the side of a boat while the flexible neck can swivel into the boat or out over the water. From the base, wiring runs back to the boat's 12 volt battery. The lamp can swivel, and it has a half-moon shroud so as to keep it out of the user's eyes. A power switch operates the lamp.

The present invention is attached to the side of the boat and the tubes and accompanying lamp to the base. When night fishing, the lamp is directed into the boat when removing a hook from a fish or retying a rig. Alternately, the lamp can be directed into the water to illuminate the area when netting a fish. The present invention is much safer to use than conventional gas lanterns or other battery-operated lights, which typically run on flashlight batteries and are only temporarily installed. The present invention offers better performance and greater convenience. Furthermore, it is much more stable and can be directed to illuminate a preferred area while leaving both fisherman's hands free to perform other tasks.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A boat utility light for providing illumination for a fisherman who is fishing under conditions of limited visibility comprising, in combination:

a rigid base further comprising:
  a planar cover plate with a top surface, a bottom surface, and a generally petaloid periphery interconnecting the surfaces formed of a front edge, a rear edge, and opposed side edges, a central bore disposed thereon, a first pair of through holes disposed thereon near the front edge, a second pair of through holes disposed thereon near the rear edge and with each through hole sized for receipt of a screw for securing the bottom surface in facing contact with a recipient supporting surface;
  a generally rectangular planar cover hingeably coupled to the top surface of the cover plate and positionable in facing contact with the top surface of the cover plate for preventing access through the bore; and
  a holding tube having an upper end coupled to the bottom surface of the cover plate in alignment with the bore thereof and a lower end projected angularly downwards therefrom to thereby create an acute angle between the holding tube and the bottom surface of the cover plate;

an elongated rigid linear lamp supporting tube having an upper end and a lower end and with the lower end slidably disposed within the bore of the cover plate and frictionally removably secured within the holding tube;

a lamp socket having a threaded base end, an electrically conductive threaded tip end, and an electrically-energizeable power switch coupled thereto, the power switch having one orientation for allowing electrical energy to be delivered to the tip end and another orientation for preventing such delivery;

a rigid and generally hemispheric light shroud secured about the lamp socket between the ends thereof and with the shroud having a circular opening with a diameter that is about 22% of the length of the lamp supporting tube;

a lamp adjustment tube formed of a piece of flexible tubing secured between the base end of the lamp socket and the upper end of the lamp supporting tube, the lamp adjustment tube having an extended linear length that is about 37% of the length of the lamp supporting tube;

a lamp removably secured within the tip end of the lamp socket within the shroud for providing illumination when electrically energized; and a pair of electrically conductive wires with each wire having a first end coupled to the power switch and a second end extended through the lamp adjustment tube and lamp supporting tube for coupling with an external source of electrical energy.

2. A boat utility light comprising:

a rigid base including a cover plate with a bore disposed thereon, a cover hingedly coupled to a top surface of the cover plate and positionable in facing contact with the cover plate over the bore, and a holding tube coupled to the plate at a location in communication with the bore thereof;

coupling means for securing the base to a recipient supporting surface;

an elongated rigid linear lamp supporting tube having an upper end and a lower end and with the lower end removably coupled to the base holding tube;

a lamp socket having a base end, and electrically conductive tip end, and an electrically-energizeable power switch coupled thereto to the socket, the power switch having one orientation for allowing electrical energy to be delivered to the tip end and another orientation for preventing such delivery;

a lamp adjustment tube formed of a piece of flexible tubing secured between the base end of the lamp socket and the upper end of the lamp supporting tube;

a lamp removably secured within the tip end of the lamp socket for providing illumination when electrically energized; and power transmission means for coupling the power switch with an external source of electrical energy.

3. The boat utility light as set forth in claim 2 further including a light shroud having a circular opening secured to the lamp socket for directing illumination to a desired location and with the opening having a diameter that is about 22% of the length of the lamp supporting tube.

4. The boat utility light as set forth in claim 2 wherein the lamp adjustment tube has an extended linear length that is about 37% the length of the lamp supporting tube.

\* \* \* \* \*